US007823536B2

(12) United States Patent
Cheng et al.

(10) Patent No.: US 7,823,536 B2
(45) Date of Patent: Nov. 2, 2010

(54) AUTOMATIC WAXING APPARATUS AND METHOD

(75) Inventors: Hung-Chiao Cheng, Hsinchu (TW); Chia-Ming Liu, Kaohsiung (TW); Ma-Tien Yang, Taoyuan County (TW); Buh-Shiuh Teng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 270 days.

(21) Appl. No.: 12/020,595

(22) Filed: Jan. 28, 2008

(65) Prior Publication Data

US 2009/0038547 A1 Feb. 12, 2009

(30) Foreign Application Priority Data

Aug. 7, 2007 (TW) ............................. 96129115 A

(51) Int. Cl.
*B05C 1/06* (2006.01)
(52) U.S. Cl. .................. 118/668; 118/679; 118/680; 118/681; 118/708; 118/712; 118/216; 118/258; 118/264; 134/45; 134/123; 15/53.1; 15/97.3; 15/DIG. 2
(58) Field of Classification Search .............. 118/668, 118/678–681, 708, 712, 216, 244, 255, 258, 118/264, 304; 15/53.1–53.4, 97.3, DIG. 2; 134/45, 123; 451/5, 8, 10, 54; 427/421.1, 427/427.2, 427.3, 428.01, 429
See application file for complete search history.

(56) References Cited

U.S. PATENT DOCUMENTS 4,893,229 A * 1/1990 Detrick ........................ 700/11

6,506,715 B1 1/2003 Schultz et al.
6,968,633 B2 * 11/2005 Morrison ...................... 34/666

FOREIGN PATENT DOCUMENTS

| CN | 2185222 | 12/1994 |
| CN | 1145316 | 3/1997 |
| JP | 11001697 | * 6/1999 |
| TW | 342698 | 10/1998 |
| TW | 1283607 | 7/2007 |

OTHER PUBLICATIONS

English Abstract of TW 342698.
English Abstract of TW 1283607.
English language translation of abstract of CN 2185222 (published Dec. 14, 1994).
English language translation of abstract of CN 1145316 (published Mar. 19, 1997).

* cited by examiner

*Primary Examiner*—Laura Edwards
(74) *Attorney, Agent, or Firm*—Thomas, Kayden, Horstemeyer & Risley

(57) ABSTRACT

An automatic waxing apparatus and a method thereof are provided. The automatic waxing apparatus includes a movable door-shaped module, at least a waxing module and a controlling module. The movable door-shaped module includes a door-shaped structure capable of moving with respect to the vehicle. The waxing module disposed on the door-shaped structure includes a wax-supplying unit and a wax-polishing unit. The controlling module is coupled to the door-shaped structure, the wax-supplying unit and the wax-polishing unit. The controlling module, according to the information of the vehicle, determines a moving path of the door-shaped structure, a waxing path of the wax-supplying unit, and a polishing path of the wax-polishing unit with respect to the vehicle.

38 Claims, 10 Drawing Sheets

AUTOMATIC WAXING APPARATUS AND METHOD

This application claims the benefit of Taiwan application Serial No. 96129115, filed Aug. 7, 2007, the subject matter of which is incorporated herein by reference.

BACKGROUND OF THE INVENTION

1. Field of the Invention

The invention relates in general to a waxing apparatus and method, and more particularly to an automatic waxing apparatus and method.

2. Description of the Related Art

With the popularity of vehicles, many families have one or more than one vehicle for daily transportation, further booming the vehicle beauty industry. Vehicle waxing is a very important job in vehicle beauty industry and needs a large amount of labor and time since customers always require high waxing quality of the vehicles.

At present, manual waxing is one of commonly used ways of waxing a vehicle. The operator applies suitable wax onto the vehicle then waxes the vehicle by a waxer. Afterward, the operator replaces the waxer by a polishing cloth wheel to polish and burnish the vehicle. The whole procedure is both time and labor consuming. Besides, the quality depends on the expertise and effort of the operator very much. From the point of view of the vehicle beauty industry, an automatic waxing machine capable of alleviating the congestion during high peak and shorting the waiting time is badly needed.

According to "Automatic Vehicle Waxer" disclosed in U.S. Pat. No. 5,076,202, a washed vehicle is parked in a vehicle waxer, then the vehicle is moved by many sets of roller chains to sequentially pass different stops of the vehicle waxer, so that the vehicle is waxed, polished, dried and so on. The vehicle waxer disclosed in the above patent is configured by many stops, not only requiring a large space but also involving the installation of highly complicated devices. Therefore, the above vehicle waxer has not yet gained popularity in the market.

SUMMARY OF THE INVENTION

The invention is directed to an automatic waxing apparatus and method thereof. The positioning, waxing and polishing of a vehicle are performed by an automatic waxing apparatus according to a vehicle waxing procedure of the vehicle.

According to a first aspect of the present invention, an automatic waxing apparatus including a movable door-shaped module, at least a waxing module and a controlling module is provided. The movable door-shaped module includes a door-shaped structure capable of moving with respect to the vehicle. The waxing module disposed on the door-shaped structure includes a wax-supplying unit and a wax-polishing unit. The controlling module is coupled to the door-shaped structure, the wax-supplying unit and the wax-polishing unit. The controlling module, according to the information of the vehicle, determines a moving path of the door-shaped structure, a waxing path of the wax-supplying unit, and a polishing path of the wax-polishing unit for the vehicle.

According to a second aspect of the present invention, an automatic waxing method including the following steps is provided. Information of the vehicle is inputted to a waxing apparatus. According to the information of the vehicle, a waxing procedure of vehicle is determined. According to the waxing procedure, a moving path of the waxing apparatus is performed, and at least a waxing path and a polishing path of the waxing apparatus for the vehicle are controlled.

The invention will become apparent from the following detailed description of the preferred but non-limiting embodiments. The following description is made with reference to the accompanying drawings.

DETAILED DESCRIPTION OF THE INVENTION

Figure 1:
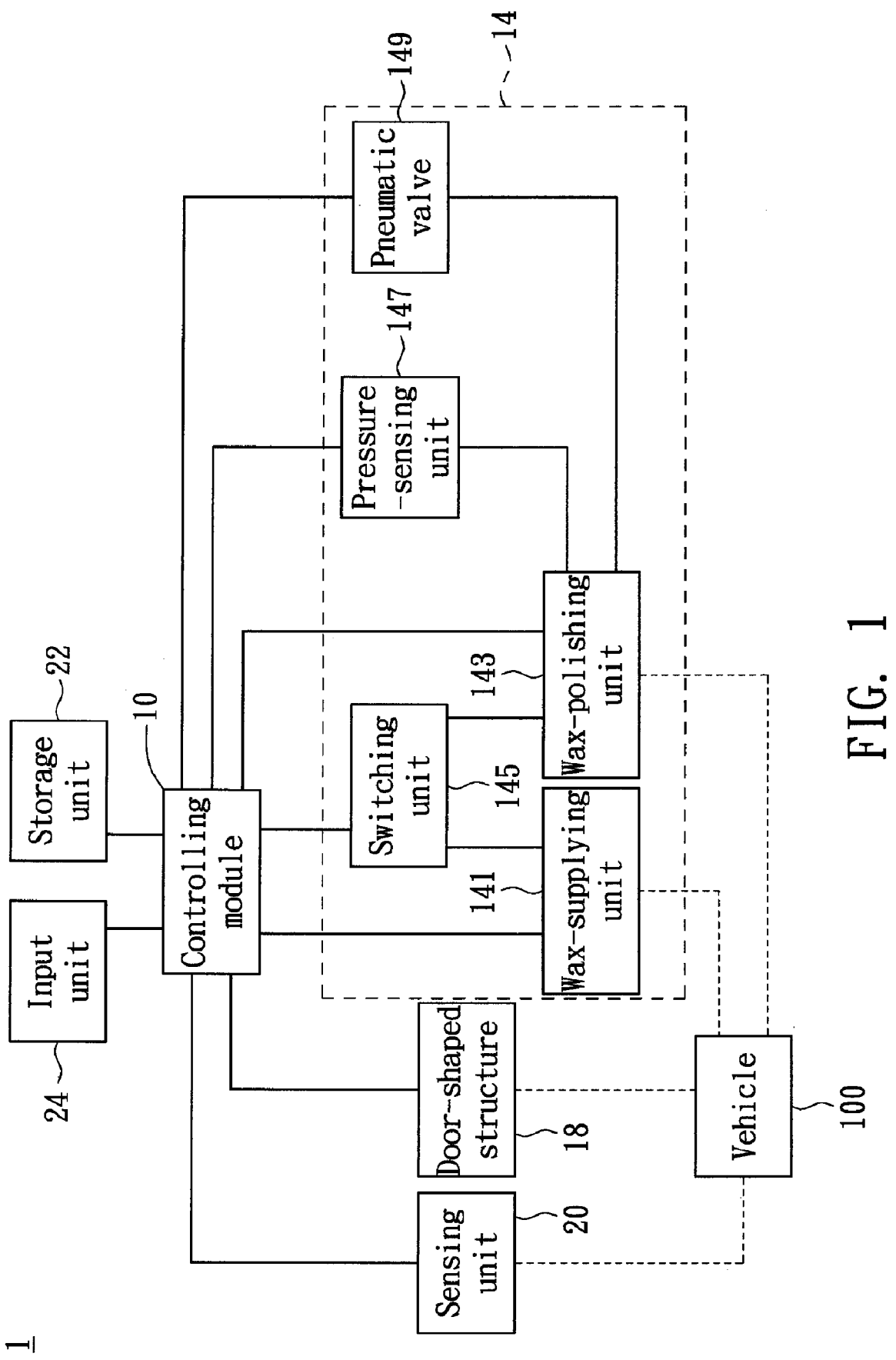
FIG. 1 is a system block diagram of an automatic waxing apparatus according to a preferred embodiment of the invention.
Figure 2A:
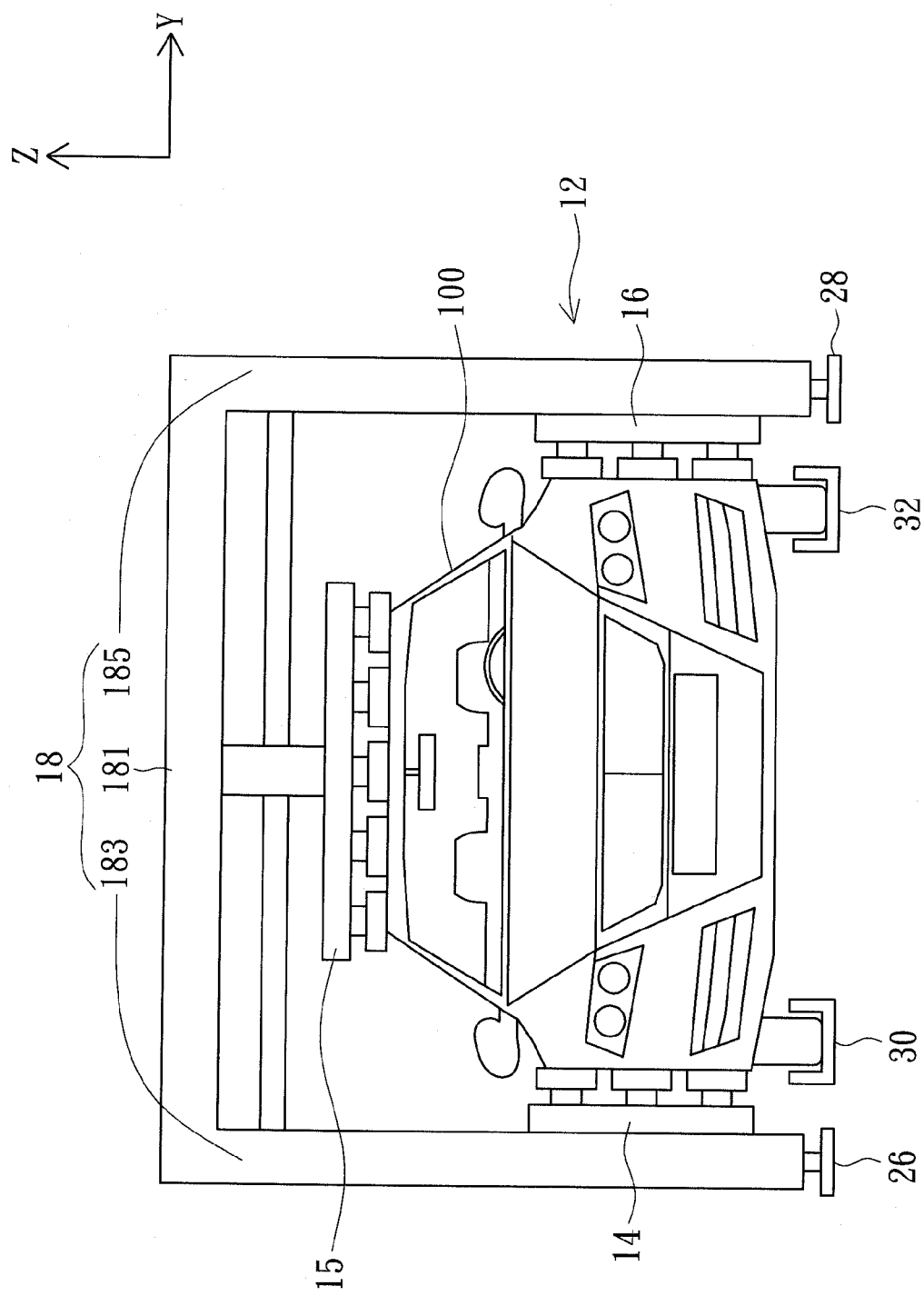
FIG. 2A is a front view of the automatic waxing apparatus of FIG. 1.
Figure 2B:
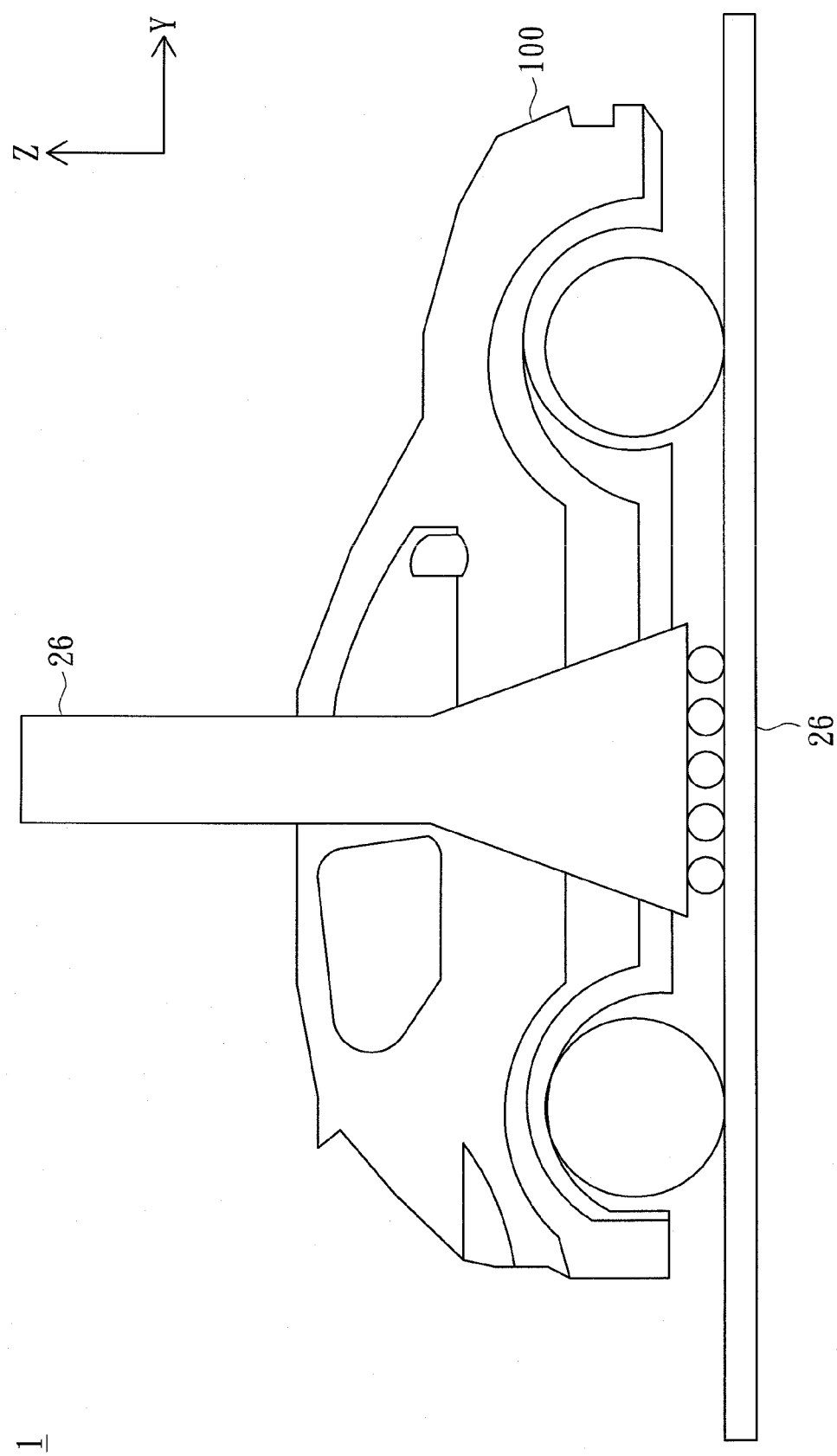
FIG. 2B is a side view of the automatic waxing apparatus of FIG. 2A.

Referring to FIG. 1, a system block diagram of an automatic waxing apparatus according to a preferred embodiment of the invention is shown. Also, referring to FIG. 2A and FIG. 2B, FIG. 2A is a front view of the automatic waxing apparatus of FIG. 1, and FIG. 2B is a side view of the automatic waxing apparatus of FIG. 2A. As indicated in FIGS. 1, 2A and 2B, the automatic waxing apparatus 1 includes a controlling module 10, a movable door-shaped module 12 and at least a waxing module. The present embodiment of the invention is exemplified by a waxing module 14. The movable door-shaped module 12 includes a door-shaped structure 18 capable of moving with respect to the vehicle 100. The waxing module 14 is disposed on the door-shaped structure 18, such that the waxing module 14 can move along with the door-shaped structure 18 with respect to the vehicle 100. Each waxing module at least includes a wax-supplying unit and a wax-polishing unit. The waxing module 14 includes a wax-supplying unit 141 and a wax-polishing unit 143. The controlling module 10 is coupled to the door-shaped structure 18, the wax-supplying unit 141 and the wax-polishing unit 143. The controlling module 10, according to information of the vehicle 100, determines a moving path of the door-shaped structure 18, a waxing path of the wax-supplying unit 141 and a polishing path of the wax-polishing unit 143 for the vehicle 100.

The waxing path of the wax-supplying unit 141 and the polishing path of the wax-polishing unit 143 are different in the present embodiment of the invention but can be designed to be the same in other embodiments.

As indicated in FIG. 1, preferably, the automatic waxing apparatus 1 further includes a sensing unit 20, a storage unit 22 and an input unit 24. The sensing unit 20 is coupled to the controlling module 10 for detecting the vehicle 100 to obtain information of the vehicle 100. The sensing unit 20 can be an optical sensor or a mechanical sensor. Preferably, the sensing unit 20 is an optical sensor, which not only reduces the complicity of the mechanical mechanism but also avoids colliding with and damaging the vehicle 100 during the procedure of detecting the vehicle 100.

The storage unit 22 is also coupled to the controlling module 10. The storage unit 22 stores many items of waxing procedure information, so that the controlling module 10 is able to obtain a waxing procedure of the vehicle 100 according to the information of the vehicle 100 and the waxing procedure information stored in the storage unit 22. The waxing procedure information stored in the storage unit 22 as a database contains different design parameters corresponding to different body shapes of vehicles.

The input module 24 is coupled to the controlling module 10 for receiving the information of the vehicle 100. For example, the input module 24 is a software interface. Via the software interface, the user can manually input basic information of the vehicle 100 to the controlling module 10.

Preferably, the controlling module 10, the storage unit 22 and the input unit 24 are intergrated in a computer host. The operator can configure computer software and database in the computer host and input various information of the vehicle 100 to the computer host for the convenience of management. Also, a suitable waxing procedure according to the information of the vehicle can be generated by the computer host.

As indicated in FIG. 2A, the movable door-shaped module 12 further includes two tracks 26 and 28 for the door-shaped structure 18 to slide on. The door-shaped structure 18 includes a top component 181 and two side components 183 and 185, wherein the two side components 183 and 185 are respectively connected to two sides of the top component 181 and slideable on the two tracks 26 and 28. The vehicle 100 is positioned within the moving range of the movable door-shaped module 12, and the extending direction of the vehicle 100 is substantially parallel to that of the tracks 26 and 28.

In the present embodiment of the invention, the automatic waxing apparatus 1 includes three waxing modules 14, 15 and 16 positioned on the side component 183, the top component 181 and side component 185 respectively for waxing and polishing the top surface and two lateral surfaces of the vehicle 100. The three waxing modules 14, 15 and 16 all include a wax-supplying unit and a wax-polishing unit. In the present embodiment of the invention, only the waxing module 14 is exemplified. As indicated in FIG. 2B, the door-shaped structure 18, which carries the waxing module 14, 15 and 16, moves along a first path of the tracks 26 and 28. The first path whose direction is the X-axis direction (or the extending direction of the vehicle 100) has much to do with the moving path of the door-shaped structure 18. With the disposition of other motion components on the door-shaped structure 18 or the waxing module 14, the waxing module 14 can further move along other paths.

For example, the waxing module 14 can further move along a second path that is substantially perpendicular to the first path, wherein the second path is relative to the waxing path and the polishing path of the waxing module 14. As indicated in FIG. 2A, the direction of the second path is the Y-axis direction and is also the feeding direction of the wax-supplying unit 141 (referring to FIG. 1) and the wax-polishing unit 143 (referring to FIG. 1) with respect to the vehicle 100. Preferably, the waxing module 14 also includes a first motion component (not illustrated) movable along the Y-axis and connected to the wax-supplying unit 141 and the wax-polishing unit 143, so that the wax-supplying unit 141 and the wax-polishing unit 143 can move along a Y-axis path. More-over, the waxing module 14 can further move along a third path whose direction is substantially perpendicular to the first path and the second path. Similarly, the third path is also relative to the waxing path and the polishing path of the waxing module 14. The direction of the third path is the Z-axis direction of FIG. 2A. Preferably, the waxing module 14 further includes a second motion component (not illustrated) movable along the Z-axis and connected to the wax-supplying unit 141 and the wax-polishing unit 143, so that the wax-supplying unit 141 and the wax-polishing unit 143 can move along a Z-axis path. Thus, the waxing module 14, which is carried by the door-shaped structure 18, is capable of moving reciprocally along the X-axis direction and is further capable of waxing and polishing all the curved surfaces of the vehicle 100 by the motion components.

The first motion component and the second motion component can be integrated to form a single bi-axial (the Y-axis and the Z-axis) motion component.

As indicated in FIG. 1, the waxing module 14 further includes a switching unit 145, a pressure-sensing unit 147 and a pneumatic valve 149. The switching unit 145 is disposed on the door-shaped structure 18 and coupled to the controlling module 10. The switching unit 145 is also coupled to the wax-supplying unit 141 and the wax-polishing unit 143. The switching unit 145 switches the position of the wax-supplying unit 141 with that of the wax-polishing unit 143 timely according to the instructions of the controlling module 10. By way of example, the switching unit 145 includes a rotating mechanism (FIG. 3), and the wax-supplying unit 141 and the wax-polishing unit 143 can be disposed on the two ends of the rotating mechanism. When the wax-supplying unit 141 and the wax-polishing unit 143 are to be switched, the rotating mechanism of the switching unit 145 is activated, so that the wax-supplying unit 141 and the wax-polishing unit 143 are switched to function with respect to the vehicle 100.

Moreover, by way of example, the switching unit 145 can include an expandable mechanism, wherein the wax-supplying unit 141 and the wax-polishing unit 143 are disposed on the expandable mechanism (referring to FIG. 4) via which the distances of the wax-supplying unit 141 and the wax-polishing unit 143 with respect to the vehicle 100 are adjusted respectively. Furthermore, as some wax of particular property can be used to burnish the vehicle directly without polishing uniformly in advance, there is no need to switch the wax-supplying unit 141 with the wax-polishing unit 143. The disposition of the wax-supplying unit and the wax-polishing unit is elaborated below.

In the waxing module 14, both the pressure-sensing unit 147 and the pneumatic valve 149 are coupled to the controlling module 10 and the wax-polishing unit 143. Preferably, the pressure-sensing unit 147 is disposed on the wax-polishing unit 143 for detecting the pressure between the wax-polishing unit 143 and the vehicle 100. When the pressure-sensing unit 147 detects that the pressure between the wax-polishing unit 143 and the vehicle 100 changes, the pressure sensing unit 147 feedbacks a signal to the controlling module 10, then the controlling module 10 drives the pneumatic valve 149 for changing the location of the wax-polishing unit 143. Thus, the waxing module 14 is adapted to the curvature change in the body shape of the vehicle 100.

Although the pressure-sensing unit 147 is only coupled to the wax-polishing unit 143 for illustration in the embodiment, the invention is not limited thereto. The pressure-sensing unit 147 can also be coupled to the wax-supplying unit 141 if the wax-supplying unit 141 would be in contact with the vehicle 100.

By way of example, the pneumatic valve 149 can be connected to the wax-supplying unit 141 for adjusting the feed of the wax-supplying unit 141 with respect to the vehicle 100. In addition, the pneumatic valve 149 can be driven by a motor. The switching unit 145 of the present embodiment of the invention and the pneumatic valve 149 are concurrently connected to the wax-polishing unit 143 and the controlling module 10. However, in other embodiments, the switching unit 145 and the pneumatic valve 149 can be integrated together.

Figure 3:
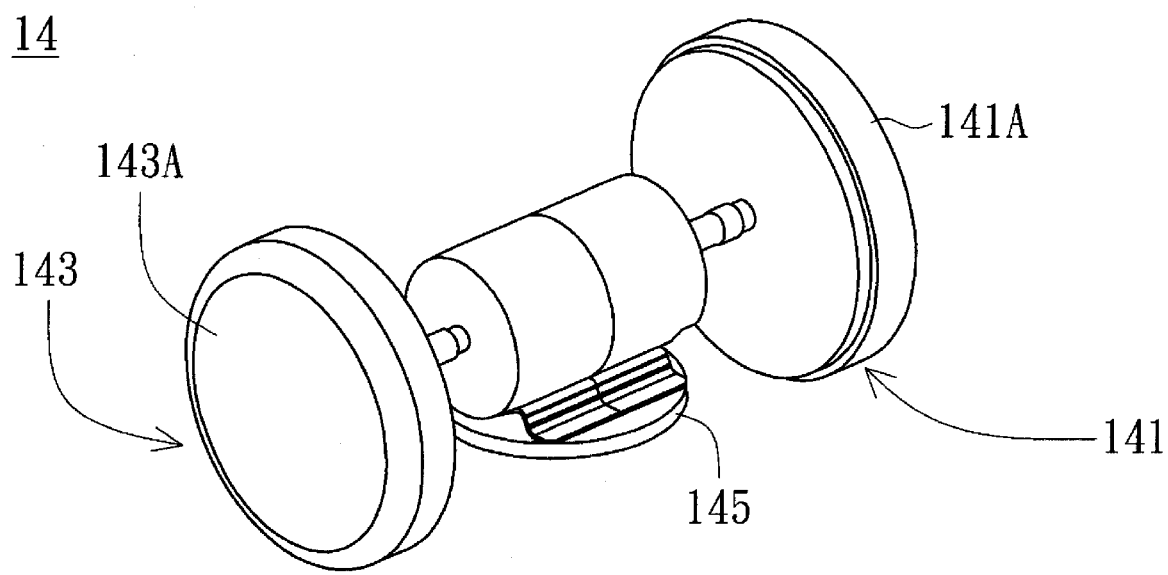
FIG. 3 is a perspective of a waxing module having a rotating mechanism.

Referring to FIG. 3, a perspective of a waxing module having a rotating mechanism is shown. As indicated in FIG. 3, the wax-supplying unit 141 of the waxing module 14 includes a wax spray nozzle (not shown) and a waxing head 141A. The wax spray nozzle is connected to a wax container (not shown), and the wax is sprayed from the wax spray nozzle onto the vehicle 100 (shown in FIG. 2A). The wax is spread on at least one waxing position on the vehicle 100 uniformly by the waxing head 141A. The wax-polishing unit 143 includes a polishing head 143A, which can be a polishing cloth wheel for burnishing the vehicle 100. In the present embodiment of the invention, the wax-supplying unit 141 and the wax-polishing unit 143 are disposed on the switching unit 145 that has a rotating mechanism. After the waxing step is completed, the switching unit 145 switches the position of the wax-supplying unit 141 with that of the wax-polishing unit 143 for subsequent polishing step to be performed.

Figure 4:
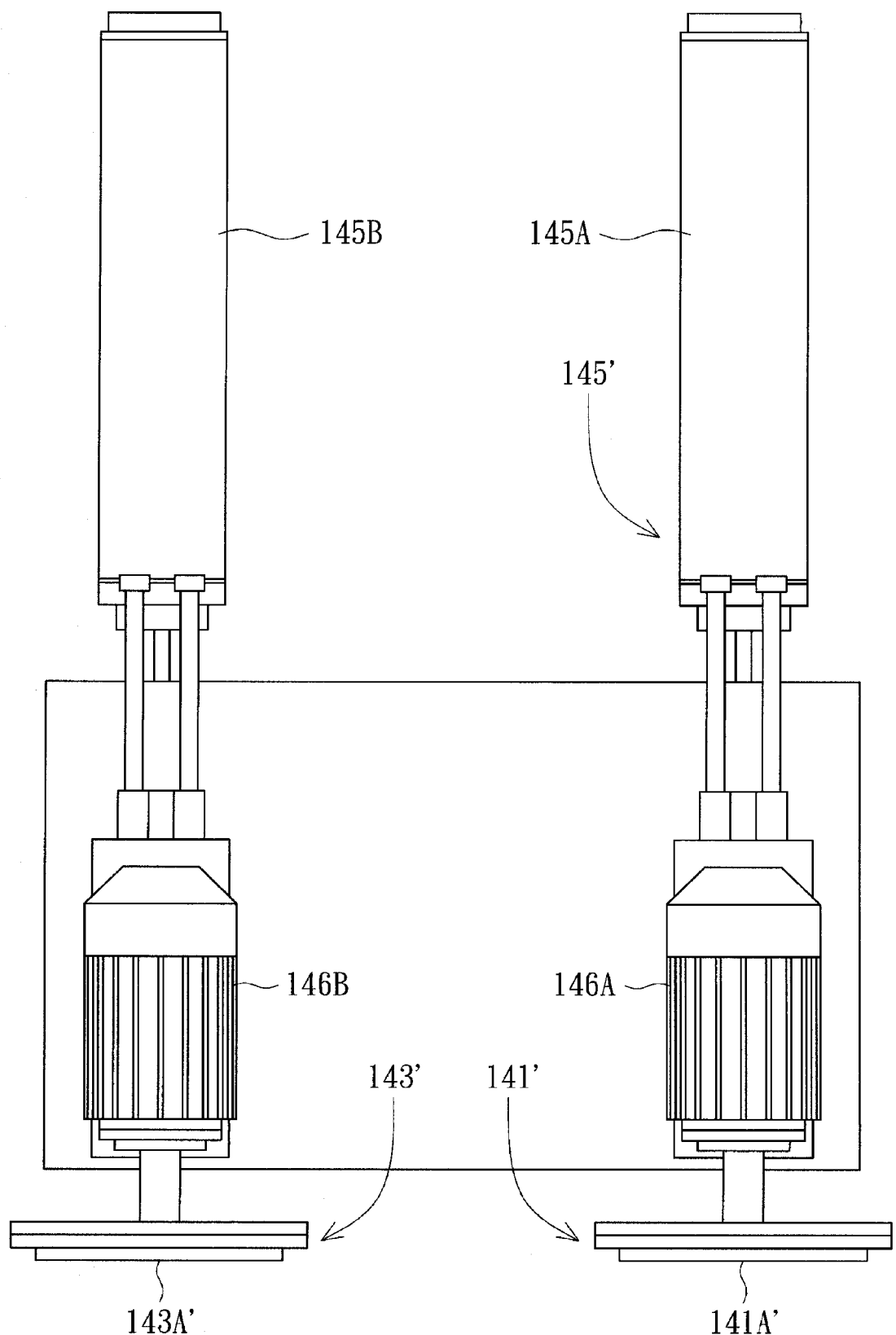
FIG. 4 is a perspective of a waxing module having an expandable mechanism.

Referring to FIG. 4, a perspective of a waxing module having an expandable mechanism is shown. As indicated in FIG. 4, the wax-supplying unit 141' and the wax-polishing unit 143' are respectively disposed on two expandable mechanisms 145A and 145B of the switching unit 145'. The expandable mechanisms 145A and 145B are two expandable air cylinders disposed on the door-shaped structure 18. The waxing head 141A' of the wax-supplying unit 141' and the polishing head 143A' of the wax-polishing unit 143' are respectively disposed on rotation motors 146A and 146B that are disposed in the expandable mechanisms 145A and 145B. The expandable mechanisms 145A and 145B drive the rotation motors 146A and 146B as well as the waxing head 141A' and the polishing head 143A' to move up and down concurrently. When the expandable mechanisms 145A and 145B drive the waxing head 141A and the polishing head 143A' to move up and down concurrently, the rotation motors 146A and 146B respectively drive the waxing head 141A' and the polishing head 143A to rotate.

The pressure-sensing unit 147 mentioned above can be integrated with the waxing head 141A' and the polishing head 143A. As the pressure-sensing unit 147 detects that the pressure between the waxing head 141A' and the vehicle 100, or the pressure between the polishing head 143A' and the vehicle 100 change, it feedbacks a signal to the controlling module 10. Afterwards, the controlling module 10 actuates the expandable mechanisms 145A and 145B to function, adjusting the locations of the rotation motors 146A, 146B, the waxing head 141A' and the polishing head 143A' accordingly.

Figure 5:
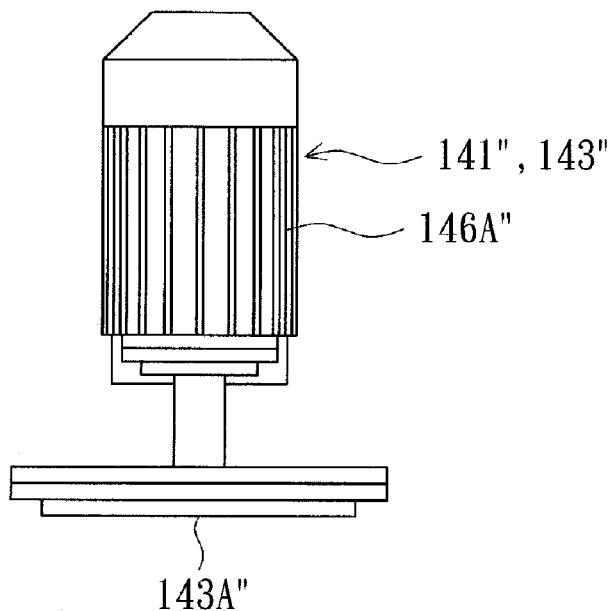
FIG. 5 is a perspective showing that the wax-supplying unit and the wax-polishing unit of the waxing module are integrated in one piece.

Referring to FIG. 5, a perspective showing that the wax-supplying unit and the wax-polishing unit of the waxing module are integrated in one piece. As indicated in FIG. 5, the wax-supplying unit 141" and the wax-polishing unit 143" are integrally formed in one piece. The polishing head 143A" of the wax-polishing unit 143" is disposed on the rotation motor 146A" that drives the polishing head 143A" to rotate so as to polish and burnish the vehicle 100. In the present embodiment of the invention, a milky wax that is easy to be spread over is adopted, so the wax-supplying unit 141" and the wax-polishing unit 143" can be integrated together for spraying the wax and polishing and burnishing the vehicle at the same time. The pressure-sensing unit 147 mentioned above can be integrated with the polishing head 143A' for detecting the pressure between the polishing head 143A' and the vehicle 100.

Figure 6:
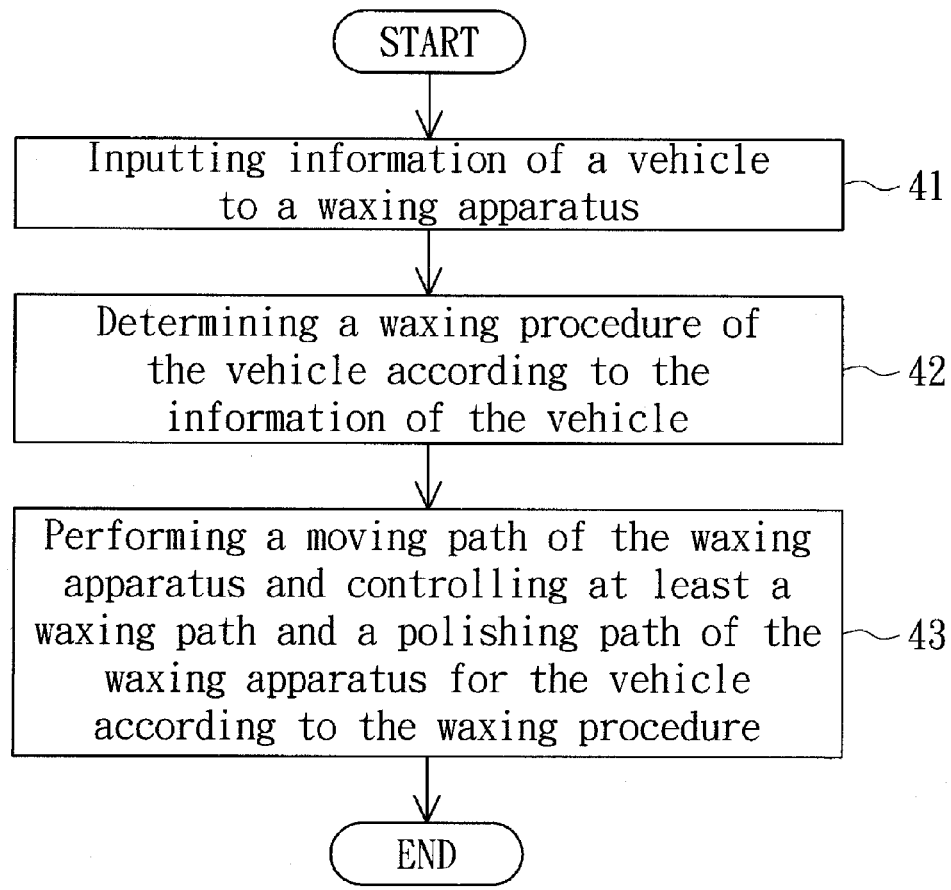
FIG. 6 is a flowchart of an automatic waxing method according to a preferred embodiment of the invention.
Figure 7:
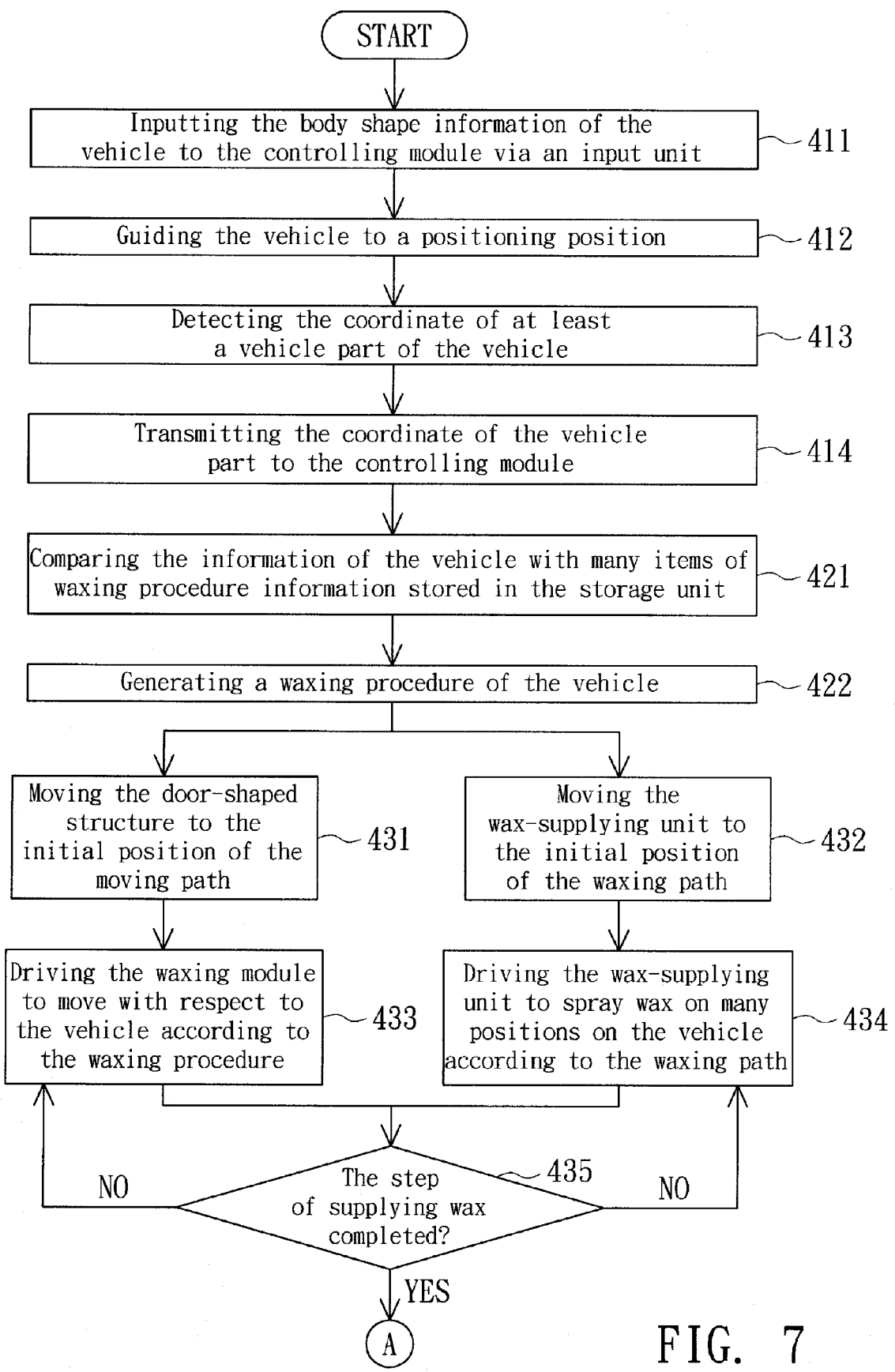
FIGS. 7 and 8 are detailed flowcharts of the automatic waxing method of FIG. 6.
Figure 8:
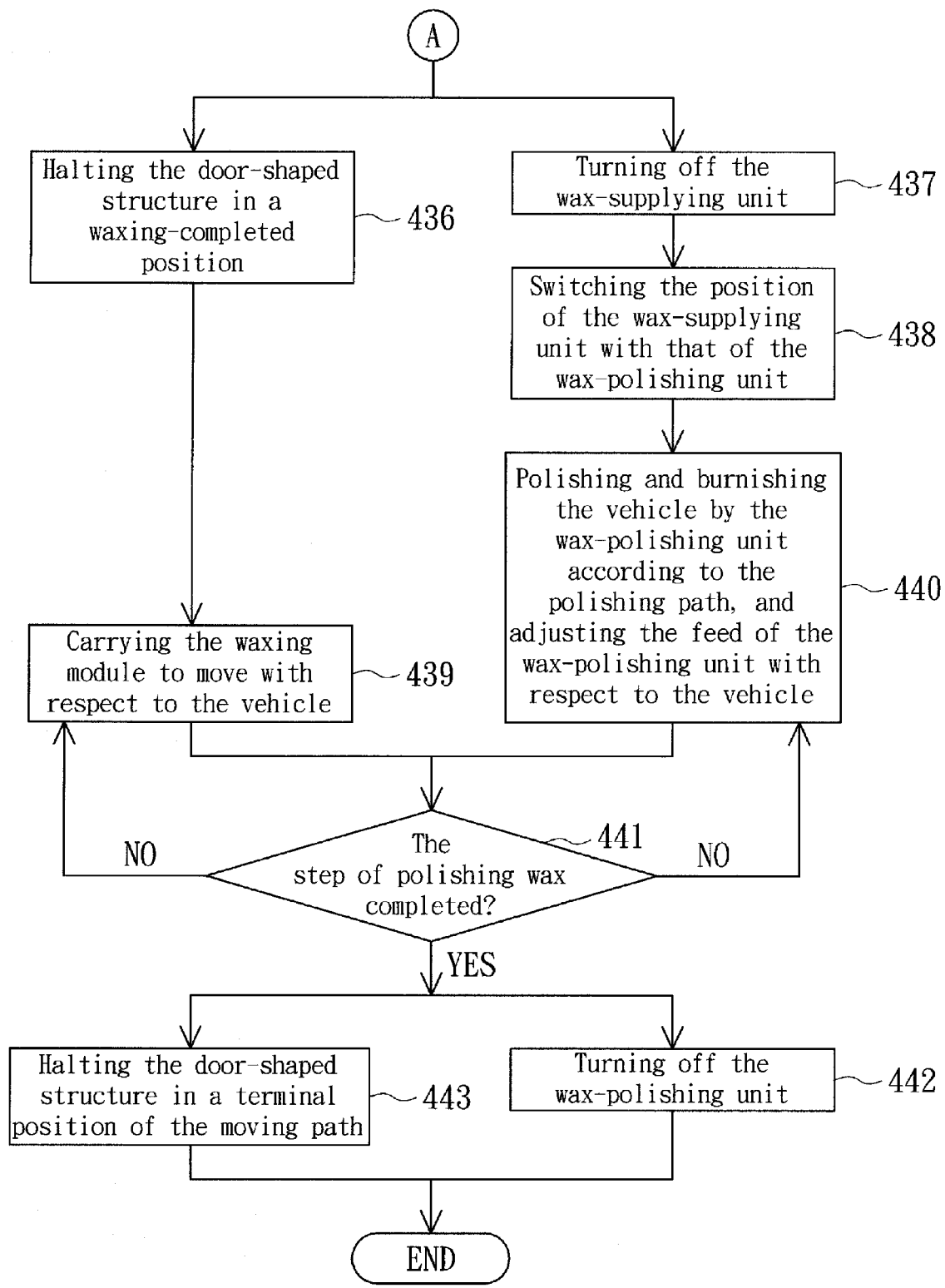

An automatic waxing method is provided in the present embodiment of the invention. In the automatic waxing method, the waxing module 14 is exemplified by the wax-supplying unit 141 and the wax-polishing unit 143 of FIG. 3. Referring to FIGS. 6-8, FIG. 6 is a flowchart of an automatic waxing method according to a preferred embodiment of the invention, and FIGS. 7-8 are detailed flowcharts of the automatic waxing method of FIG. 6. As shown in FIG. 6, the automatic waxing method includes steps 41~43. Firstly, information of the vehicle 100 is inputted to the waxing apparatus 1. Next, a waxing procedure of the vehicle 100 is determined according to the information of the vehicle 100. Then, according to the waxing procedure, a moving path of the waxing apparatus 1 for the vehicle 100 is performed, and at least a waxing path and a polishing path of the waxing apparatus 1 for the vehicle 100 are controlled.

The method begins at step 41. Firstly, information of the vehicle 100 is inputted to the waxing apparatus 1 to create a file containing the information of the vehicle 100. As indicated in FIG. 7, step 41 further includes step 411, body shape information of the vehicle 100 is inputted to the controlling module 10.

Nowadays, vehicle manufacturers provide vehicles of various makes to meet customers' versatile needs. However, the specifications and dimensions for different vehicle makes are variable, so the operation of the waxing apparatus 1 is preferably adjustable to fit different vehicle makes. Let sedan, sport utility vehicle (SUV) and bus be taken for comparison. Bus has the longest body length, so the door-shaped structure 18 needs a largest moving path when driving the waxing module 14 to touch the entire body of the bus. As for SUV or sedan that has shorter body length, the door-shaped structure 18 does not require a large moving path. Moreover, as different vehicles makes have different curvatures of the vehicle body, the feed and the coverage of the waxing module 14 with respect to the vehicle 100 must be adjusted accordingly.

According to the body shape information of the vehicle 100, the waxing apparatus 1 can determine a waxing procedure that is most suitable to the vehicle 100 according to the body shape information. In step 411, body shape information of the vehicle 100 is inputted to the controlling module 10 via an input unit 24 such as a software interface that is used to create a file containing the information of the vehicle 100.

As indicated in FIG. 7, step 41 further includes step 412, the vehicle 100 is guided to a positioning location. Normally, the vehicle 100 is cleaned first and waxed next. The operator can drive the cleaned vehicle 100 into the waxing apparatus 1 along the pre-determined tracks 30 and 32 (referring to FIG. 2A) of the waxing apparatus 1, and then park the vehicle 100 in the positioning location.

Step 41 further includes steps 413~414, the coordinate of at least a vehicle part of the vehicle 100 are detected and transmitted to the controlling module 10 for creating a file containing the body shape information of the vehicle 100. In the waxing apparatus 1, the sensing unit 20 detects the coordinates of the front edges of the windscreen, the roof and the boot, the rear edge of the roof, and the bottom edge of door window by optical or mechanical method. Therefore, the controlling module 10 can estimate the width and the height of the vehicle 10 as well as the dimensions of particular vehicle parts according to the detected coordinates.

In the present embodiment of the invention, the coordinates of the vehicle parts are detected by the sensing unit 20. Alternately, the operator can measure the dimensions directly and then input the measurements into the controlling module 10 via the input unit 24 for establishing the body shape information of the vehicle 100.

Despite the input of the information of the vehicle 100 into the waxing apparatus 1 is exemplified by steps 411~414 in the present embodiment of the invention, the technology of the invention is not limited thereto. Also, step 412 can be performed before step 411; step 411 and step 413 can be merged in one step.

Next, the automatic waxing method proceeds to step 42, a waxing procedure of the vehicle 100 is determined according to the information of the vehicle 100. As indicated in FIG. 7, step 42 includes steps 421 and 422, the information of the vehicle 100 is compared with many items of waxing procedure information stored in the storage unit 22 first, and then a waxing procedure of the vehicle 100 is generated. The body shape information of the vehicle 100 includes the coordinates of many vehicle parts of the vehicle 100, and many items of waxing procedure information are stored in the storage unit 22. Through comparison, the controlling module 10 selects a waxing program that is suitable for the vehicle 100 and introduces the parameters of the body shape information (the coordinates of vehicle parts) to the waxing program for generating a waxing procedure most suitable to the vehicle 100. The waxing procedure of the vehicle 100 at least includes the moving path of the door-shaped structure 18, the waxing path of the wax-supplying unit 141 and the polishing path of the wax-polishing unit 143.

The moving path of the door-shaped structure 18 is a path from the head of the vehicle 100 to the tail of the vehicle 100 along the tracks 26 and 28 (such as the Y-axis direction of FIG. 2B). The moving path can also be a path from the vehicle tail to the vehicle head, or a path reciprocating between vehicle head and vehicle tail. However, the moving path of the door-shaped structure 18 can be defined as the range between two different vehicle parts of the vehicle 100.

The waxing module 14, when driven by the door-shaped structure 18, moves along the tracks 26 and 28. According to the coordinates of the vehicle parts, the controlling module 10 automatically generates the waxing path and the polishing path. However, apart from moving along the tracks 26 and 28 with the door-shaped structure 18, the wax-supplying unit 141 and the wax-polishing unit 143 can move in the Y-axis direction and the Z-axis direction, so that the waxing path and the polishing path can be determined according to the overall height of the vehicle 100 as well.

After the waxing procedure of the vehicle 100 is determined, the waxing method proceeds to step 43. According to waxing procedure, the moving path of the door-shaped structure 18 for the vehicle 100 as well as the waxing path and the polishing path of the waxing apparatus 1 for the vehicle 100 are performed. As indicated in FIGS. 7 and 8, step 43 includes steps 431~443, which are elaborated below.

As indicated in steps 431 and 432, the door-shaped structure 18 of the waxing apparatus 1 is activated and moved to the initial position of the moving path, and the wax-supplying unit 141 is moved to the initial position of the waxing path. In the present embodiment of the invention, the wax-supplying unit 141 waxes the vehicle 100 from the head to the tail of the vehicle 100. As the door-shaped structure 18 is already moved to the head of the vehicle 100, the wax-supplying unit 141 approaches a fender of the vehicle 100 along the Y-axis direction.

Next, as indicated in step 433, the door-shaped structure 18 drives the waxing module 14 to move with respect to the vehicle 100 according to the waxing procedure. As indicated in step 434, the wax-supplying unit 141 sprays wax on many positions on the vehicle 100 according to the waxing path. During the course of moving the door-shaped structure 18 from vehicle head to vehicle tail, the controlling module 10 controls the wax spray nozzle of the wax-supplying unit 141 to spray proper amount of wax, and the wax-supplying unit 141 can also move along the Z-axis and the Y-axis direction.

As indicated in step 435, the controlling module 10 determines whether the step of supplying wax to the vehicle is completed. If the waxing step is not yet completed, the door-shaped structure 18 that carries the waxing module 14 keeps on moving, and the wax-supplying unit 141 also continuously supplies wax according to the waxing procedure. If the waxing step is already completed, as indicated in step 436, the controlling module 10 halts the door-shaped structure 18 in a waxing-completed position of the moving path. In the present embodiment of the invention, the waxing-completed position is around the tail of the vehicle 100.

As the door-shaped structure 18 stops at the tail of the vehicle 100, as indicated in steps 437, 438, the controlling module 10 turns off the wax-supplying unit 141 and switches the position of the wax-supplying unit 141 with the position of the wax-polishing unit 143. After the waxing step is completed, the controlling module 10 drives the switching unit 145 to change the position of the wax-supplying unit 141 with that of the wax-polishing unit 143 for performing the next step of polishing and burnishing the vehicle 100.

After the wax-supplying unit 141 and the wax-polishing unit 143 are switched, the wax-polishing unit 143 is moved to the initial position of the polishing path according to the waxing procedure. Next, as indicated in step 439, the door-shaped structure 18 that carries the waxing module 14 continues to move according to the moving path. The door-shaped structure 18 moves from the position where the vehicle tail is located.

As indicated in step 440, the wax-polishing unit 143 polishes and burnishes the vehicle 100 according to the polishing path, and the controlling module 10 adjusts the feed of the wax-polishing unit 143 with respect to the vehicle 100. According to the polishing path of the wax-polishing unit 143, the controlling module 10 drives the door-shaped structure 18 along with the wax-polishing unit 143 to move between the vehicle tail and the vehicle head. The controlling module 10 can also drive the wax-polishing unit 143 to move along the Z-axis direction for polishing the entire body of the vehicle 100.

When the wax-polishing unit 143 polishes and burnishes the vehicle 1001 the pressure-sensing unit 147 coupled to the wax-polishing unit 143 and the controlling module 10 senses the change in the pressure between the wax-polishing unit 143 and the vehicle tail and then feedbacks a signal to the controlling module 10 for automatically adjusting the feed of the wax-polishing unit 143 along the Y-axis direction. Thus, the waxing module 14 is adapted to curvature change of the body shape of the vehicle 100 so as to wax different curved surfaces of the vehicle 100.

As indicated in step 441, the controlling module 10 determines whether the polishing path of the wax-polishing unit 143 is completed according to the waxing procedure. If the polishing path of the wax-polishing unit 143 is completed, then the automatic waxing method proceeds to step 442, the wax-polishing unit 143 is turned off. Meanwhile, as indicated in step 443, the door-shaped structure 18 halts in a terminal position of the moving path. The terminal position is the mechanical original point of the door-shaped structure 18 in the waxing apparatus 1 such as the terminal of the tracks 26 and 28. Afterwards, the operator drives the vehicle 100 off the predetermined tracks 30 and 32 of the waxing apparatus 1. The waxing procedure is completed here.

According to the waxing module 14 of the present embodiment of the invention, the wax-supplying unit 141 and the wax-polishing unit 143 have an waxing head 141A and a polishing head 143A, respectively (referring to FIG. 3), so the automatic waxing method follows the steps of completing the waxing procedure, switching the wax-supplying unit with the wax-polishing unit, and polishing and burnishing the vehicle. However, the technology of the invention is not limited thereto. For example, if the waxing module in FIG. 5 that integrates the wax-supplying unit 141" and the wax-polishing unit 143" in one piece is adopted, there is no need to switch the wax-supplying unit 141" with the wax-polishing unit 143", and the waxing path is the same as the polishing path. Moreover, since the present embodiment of the invention uses a milky wax, the polishing and burnishing step can be performed concurrently with the waxing step.

The present embodiment of the invention is exemplified by waxing the vehicle 100 by the waxing module 14. However, the operation of the other two waxing modules 15 and 16 positioned on the door-shaped structure 18 is similar to the operation of the waxing module 14. The three waxing modules 14, 15 and 16 are different in the feeding direction with respect to the vehicle 100 due to the difference in the corresponding surface curvature of the body shape. For example, for the waxing module 15 corresponding to the top surface of the vehicle 100, the waxing module 15 adjusts the feed of its wax-supplying unit and wax-polishing unit with respect to the vehicle 100 by moving along the Z-axis direction so as to adapt to the change in the curvature formed by the roof and the hood of the vehicle 100. Furthermore, when the door-shaped structure 18 moves, the three waxing modules 14, 15 and 16 disposed on the door-shaped structure 18 can wax, polish and burnish the two door sides and the roof of the vehicle 100 either synchronically or non-synchronically. Preferably, the three waxing modules 14, 15 and 16 wax, polish and burnish the two door sides and the roof of the vehicle 100 synchronically.

Figure 9A:
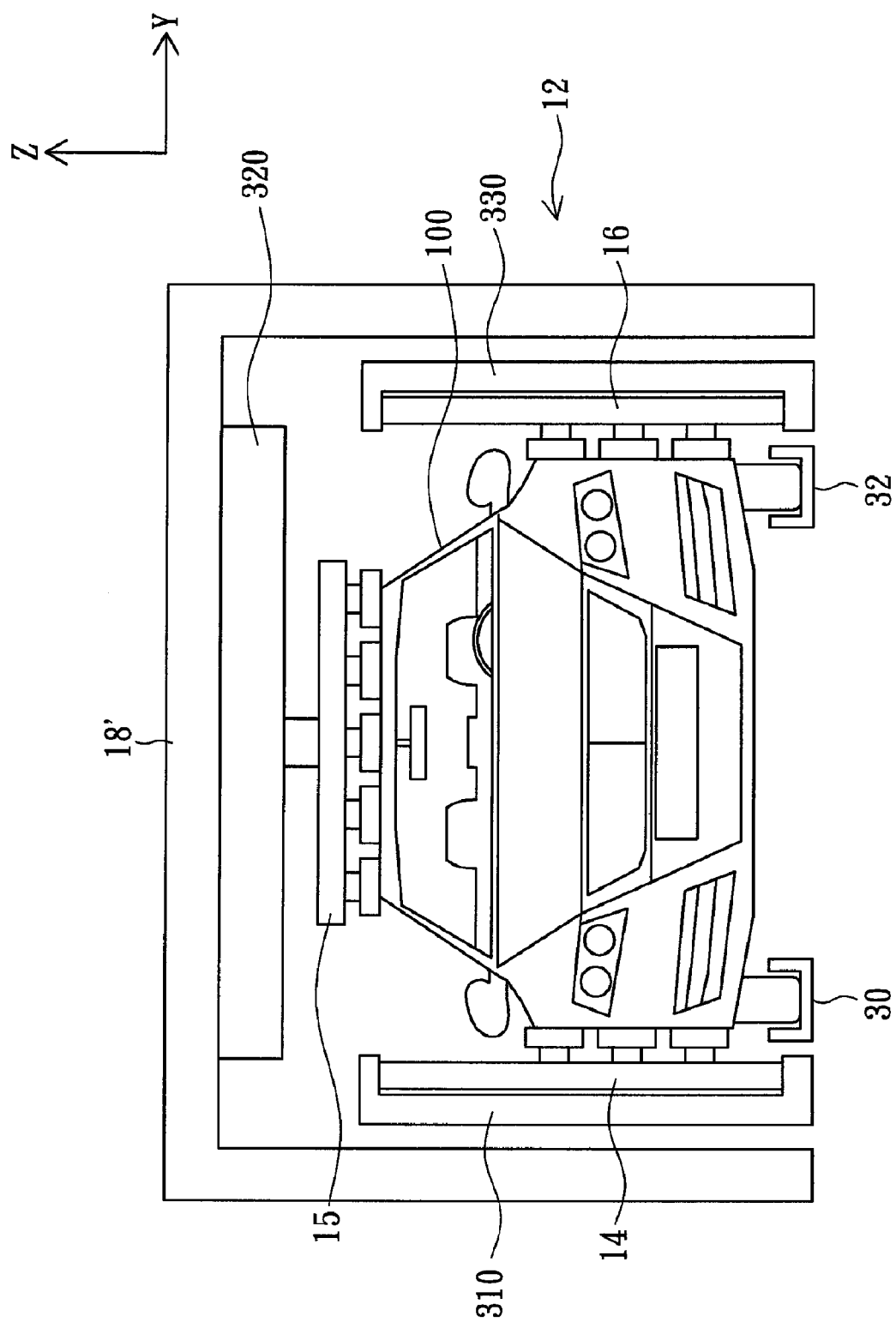
FIG. 9A is a front view of an automatic waxing apparatus having three waxing modules capable of moving independently.
Figure 9B:
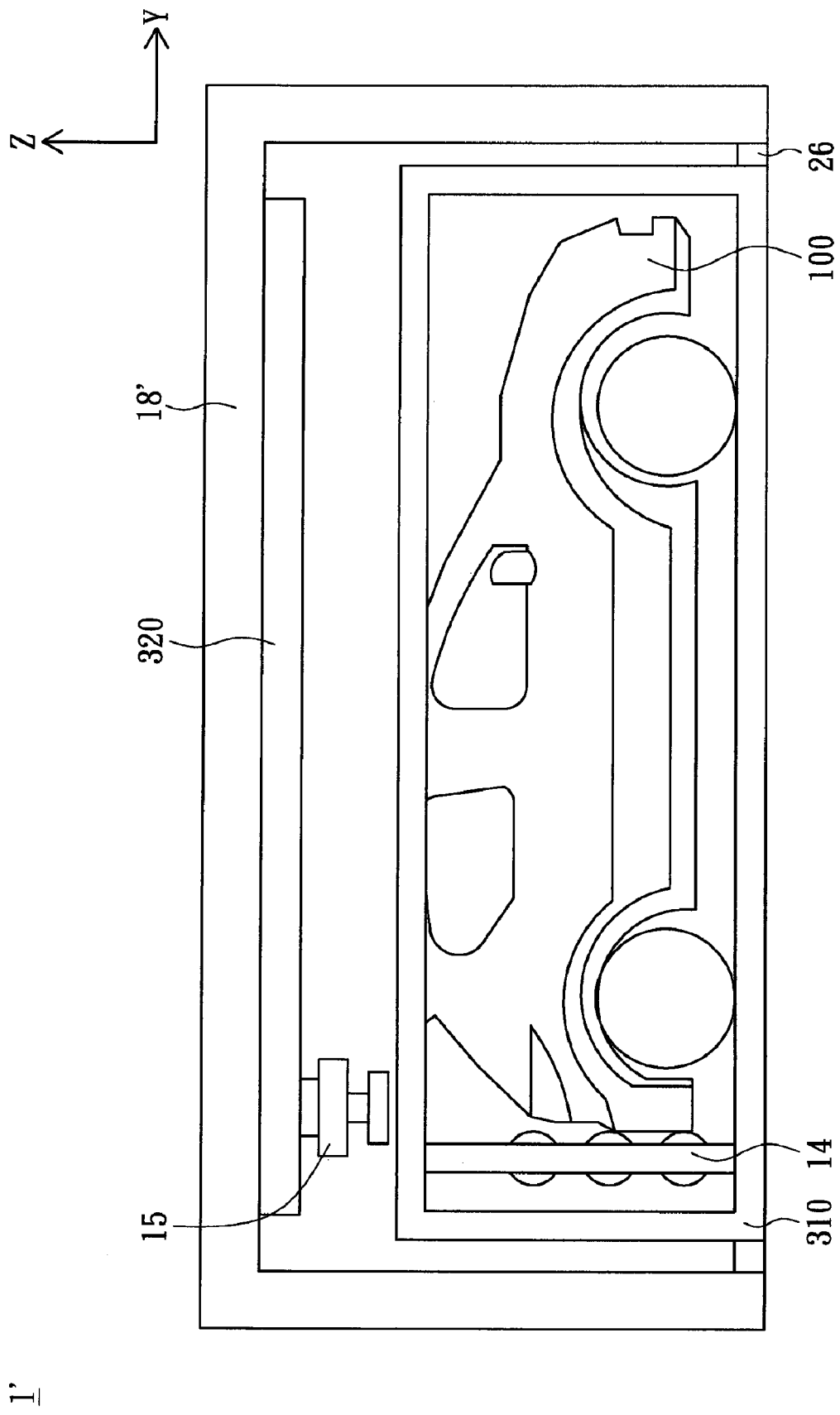
FIG. 9B is a side view of the automatic waxing apparatus of FIG. 9A.

The automatic waxing apparatus 1 disclosed above has one movable door-shaped structure 18 used for moving the waxing modules 14, 15 and 16 at the same time. However, the waxing modules 14, 15 and 16 can be disposed on different sliding tracks to move respectively. FIG. 9A is a front view of an automatic waxing apparatus having three waxing modules capable of moving independently. FIG. 9B is a side view of the automatic waxing apparatus of FIG. 9A. The automatic waxing apparatus 1' has a door-shaped structure 18'. A sliding track 310 is disposed adjacent to the left part of the door-shaped structure 18'. A sliding track 320 is disposed on the door-shaped structure 18'. A sliding track 330 is disposed adjacent to the right part of the door-shaped structure 18'. The waxing modules 14, 15 and 16 are disposed on the sliding tracks 310, 320 and 330, respectively. Therefore, the waxing modules 14, 15 and 16 can move along the sliding tracks 310, 320 and 330, respectively, and do not necessary move at the same time nor along the same moving path. It is noted that the sliding tracks 310 and 330 can also be integrated with the door-shaped structure 18'.

The switching units 145 and 145' (shown in FIGS. 3 and 4) mentioned above can also be used in the automatic waxing apparatus 1' for adjusting the positions of the waxing modules 14, 15 and 16.

The automatic waxing apparatus disclosed in the present embodiment of the invention automatically detects the position of the vehicle and generates suitable waxing procedure according to the information of the vehicle for automatically waxing, polishing and burnishing the vehicle, lowering the labor and time consumption. The automatic waxing apparatus of the present embodiment of the invention can sense the change in the pressure between the waxing module and the vehicle and accordingly adjusts the feed of the waxing module with respect to the vehicle. Therefore, the automatic waxing apparatus of the present embodiment of the invention is adapted to any curvature change in the body shape of the vehicle so as to wax the entire body of the vehicle. Furthermore, the automatic waxing apparatus of the present embodiment of the invention has only 1 stop, and there is no need to move the vehicle once the vehicle is positioned, hence lowering the complicity of the waxing apparatus and saving the space for the waxing apparatus.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic waxing apparatus used in a vehicle, the waxing apparatus comprising:
    a movable door-shaped module having a door-shaped structure capable of moving with respect to the vehicle;
    at least a waxing module disposed on the door-shaped structure, wherein the waxing module has a wax-supplying unit and a wax-polishing unit;
    an input unit coupled to a controlling module for receiving information of the vehicle; and
    the controlling module coupled to the door-shaped structure, the wax-supplying unit and the wax-polishing unit, wherein the controlling module, according to the information of the vehicle, determines a moving path of the door-shaped structure, a waxing path of the wax-supplying unit, and a polishing path of the wax-polishing unit for the vehicle.

2. The waxing apparatus according to claim 1, wherein the door-shaped structure drives the waxing module to move along a first path substantially parallel to an extending direction of the vehicle.

3. The waxing apparatus according to claim 2, wherein the waxing module further moves along a second path substantially perpendicular to the first path.

4. The waxing apparatus according to claim 3, wherein the direction of the second path is a feeding direction of the wax-supplying unit and the wax-polishing unit with respect to the vehicle.

5. The waxing apparatus according to claim 3, wherein the waxing module further moves along a third path, and the first path, the second path and the third path are substantially perpendicular to one another.

6. The waxing apparatus, according to claim 1, wherein the door-shaped structure comprises:
 a top component; and
 two side components respectively connected to two sides of the top component.

7. The waxing apparatus according to claim 6, further comprising three waxing modules respectively disposed on the top component and the two side components.

8. The waxing apparatus according to claim 6, wherein the movable door-shaped module further comprises two tracks coupled to the two side components, so that the two side components are slideable on the two tracks respectively.

9. The waxing apparatus according to claim 1, wherein the wax-supplying unit comprises a waxing head supplying wax to at least a waxing position on the vehicle according to the waxing path.

10. The waxing apparatus according to claim 1, wherein the wax-polishing unit comprises a polishing head for polishing and burnishing the vehicle according to the polishing path.

11. The waxing apparatus according to claim 1, wherein the wax-polishing unit comprises a polishing head for polishing and burnishing at the same time according to the waxing path.

12. The waxing apparatus according to claim 1, wherein the waxing module further comprises a switching unit disposed on the door-shaped structure and used for switching the position of the wax-supplying unit with that of the wax-polishing unit.

13. The waxing apparatus according to claim 1, wherein the waxing module further comprises a pressure-sensing unit coupled to the controlling module and the wax-polishing unit for detecting the pressure between the wax-polishing unit and the vehicle.

14. The waxing apparatus according to claim 13, wherein when the pressure-sensing unit detects that the pressure between the wax-polishing unit and the vehicle changes, the pressure-sensing unit feedbacks a signal to the controlling module for adjusting the feed of the wax-polishing unit.

15. The waxing apparatus according to claim 14, wherein the waxing module further comprises a pneumatic valve coupled to the controlling module and the wax-polishing unit and used for adjusting the feed of the wax-polishing unit.

16. The waxing apparatus according to claim 1, further comprising:
 a storage unit storing a plurality of items of waxing procedure information, wherein the controlling module generates a waxing procedure of the vehicle according to the information of the vehicle and the waxing procedure information of the storage unit.

17. The waxing apparatus according to claim 16, wherein the waxing procedure at least comprises the information of the moving path, the waxing path, and the polishing path.

18. The waxing apparatus according to claim 1, wherein the input unit is an optical sensor or a mechanical sensor.

19. The waxing apparatus according to claim 1, wherein the information of the vehicle comprises the body shape information and a coordinate of at least one vehicle part of the vehicle.

20. An automatic waxing apparatus used in a vehicle, the waxing apparatus comprising:
 a movable door-shaped module having a door-shaped structure capable of moving with respect to the vehicle;
 at least a waxing module disposed on the door-shaped structure, wherein the waxing module has a wax-supplying unit and a wax-polishing unit;
 a sensing unit coupled to a controlling module for sensing the vehicle to obtain information of the vehicle; and
 the controlling module coupled to the door-shaped structure, the wax-supplying unit and the wax-polishing unit, wherein the controlling module, according to the information of the vehicle, determines a moving path of the door-shaped structure, a waxing path of the wax-supplying unit, and a polishing path of the wax-polishing unit for the vehicle.

21. The waxing apparatus according to claim 20, wherein the door-shaped structure drives the waxing module to move along a first path substantially parallel to an extending direction of the vehicle.

22. The waxing apparatus according to claim 21, wherein the waxing module further moves along a second path substantially perpendicular to the first path.

23. The waxing apparatus according to claim 22, wherein the direction of the second path is a feeding direction of the wax-supplying unit and the wax-polishing unit with respect to the vehicle.

24. The waxing apparatus according to claim 22, wherein the waxing module further moves along a third path, and the first path, the second path and the third path are substantially perpendicular to one another.

25. The waxing apparatus, according to claim 20, wherein the door-shaped structure comprises:
 a top component; and
 two side components respectively connected to two sides of the top component.

26. The waxing apparatus according to claim 25, further comprising three waxing modules respectively disposed on the top component and the two side components.

27. The waxing apparatus according to claim 25, wherein the movable door-shaped module further comprises two tracks coupled to the two side components, so that the two side components are slideable on the two tracks respectively.

28. The waxing apparatus according to claim 20, wherein the wax-supplying unit comprises a waxing head supplying wax to at least a waxing position on the vehicle according to the waxing path.

29. The waxing apparatus according to claim 20, wherein the wax-polishing unit comprises a polishing head for polishing and burnishing the vehicle according to the polishing path.

30. The waxing apparatus according to claim 20, wherein the wax-polishing unit comprises a polishing head for polishing and burnishing at the same time according to the waxing path.

31. The waxing apparatus according to claim 20, wherein the waxing module further comprises a switching unit disposed on the door-shaped structure and used for switching the position of the wax-supplying unit with that of the wax-polishing unit.

32. The waxing apparatus according to claim 20, wherein the waxing module further comprises a pressure-sensing unit coupled to the controlling module and the wax-polishing unit for detecting the pressure between the wax-polishing unit and the vehicle.

33. The waxing apparatus according to claim 32, wherein when the pressure-sensing unit detects that the pressure between the wax-polishing unit and the vehicle changes, the pressure-sensing unit feedbacks a signal to the controlling module for adjusting the feed of the wax-polishing unit.

34. The waxing apparatus according to claim 33, wherein the waxing module further comprises a pneumatic valve coupled to the controlling module and the wax-polishing unit and used for adjusting the feed of the wax-polishing unit.

35. The waxing apparatus according to claim 20, further comprising:
a storage unit storing a plurality of items of waxing procedure information, wherein the controlling module generates a waxing procedure of the vehicle according to the information of the vehicle and the waxing procedure information of the storage unit.

36. The waxing apparatus according to claim 35, wherein the waxing procedure at least comprises the information of the moving path, the waxing path, and the polishing path.

37. The waxing apparatus according to claim 20, wherein the sensing unit is an optical sensor or a mechanical sensor.

38. The waxing apparatus according to claim 20, wherein the information of the vehicle comprises body shape information and a coordinate of at least one vehicle part of the vehicle.

* * * * *